No. 751,642.

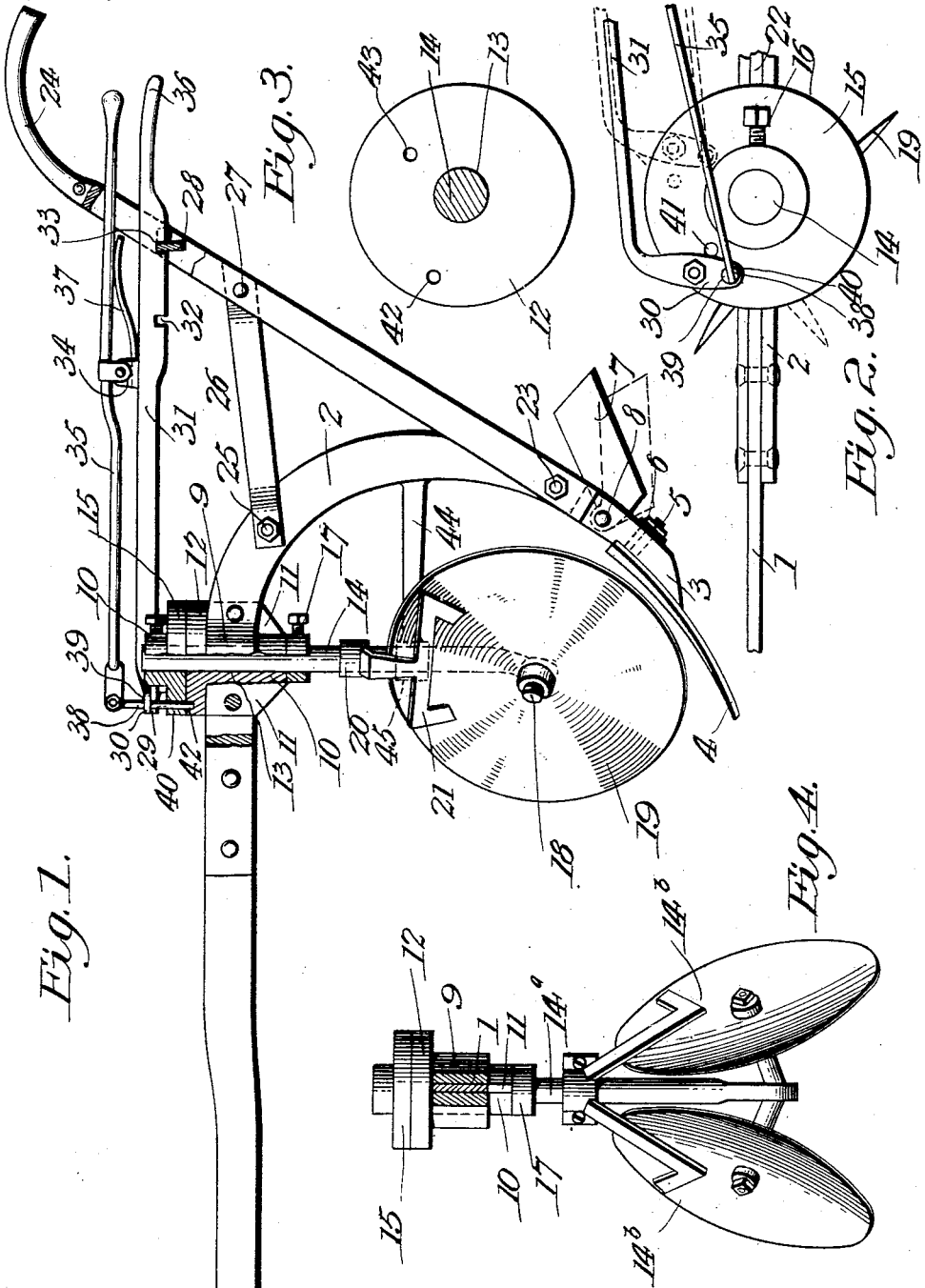

Patented February 9, 1904.

UNITED STATES PATENT OFFICE.

EDWARD G. HENRY, OF CARROLLTON, GEORGIA, ASSIGNOR OF ONE-HALF TO W. T. HERRIN, OF CARROLLTON, GEORGIA.

PLOW.

SPECIFICATION forming part of Letters Patent No. 751,642, dated February 9, 1904.

Application filed May 11, 1903. Serial No. 156,669. (No model.)

*To all whom it may concern:*

Be it known that I, EDWARD G. HENRY, a citizen of the United States, residing at Carrollton, in the county of Carroll and State of Georgia, have invented a new and useful Plow, of which the following is a specification.

This invention relates to that class of disk plows which are used in connection with subsoilers; and it has for its object to provide a plow of this class with a reversible disk whereby it may be used either as a right or as a left handle plow, as may be demanded by circumstances, so that it may be used successfully upon a hillside or wherever it shall be desired to follow up each furrow by turning the soil in a reverse direction.

My invention has for its object to provide a plow of this class which shall possess superior advantages in point of simplicity, durability, and general efficiency; and with these and other ends in view the invention consists in the improved construction, arrangement, and combination of parts, which will be hereinafter fully described, and particularly pointed out in the claims.

In the accompanying drawings, Figure 1 is a side elevation of a reversible disk plow constructed in accordance with the principles of my invention. Fig. 2 is a detail top plan view showing a portion of the beam, the adjusting-disk, and related parts. Fig. 3 is a plan view of the supporting-disk subjacent to the adjusting-disk. Fig. 4 is a transverse sectional view showing a pair of disks applied to my improved plow structure for the purpose of converting the same into a lister.

Corresponding parts in the several figures are indicated by similar numerals of reference.

The beam 1 of my improved plow is provided at its rear end with downwardly-curved extensions 2 2, coöperating to form the standard and the lower ends of said extension pieces being welded together or otherwise suitably connected, so as to form the point 3, upon which the blade 4, constituting the subsoiler, may be mounted in the usual manner by means of a bolt and nut 5 6. A heel-piece 7 is secured between the standard-pieces 2 2 in rear of the point, said heel-piece being mounted pivotally upon a bolt 8, which may be tightened to secure said heel-piece at any desired adjustment. This heel-piece constitutes a guide whereby the implement is directed and prevented from swerving from a straight line in its forward course. Directly in rear of the beam 1 the standard-pieces 2 2 are bulged, as shown at 9, in order to accommodate between them a sleeve 10, having wings 11, which are extended between the unbulged portions of the standard-pieces and which being of equal thickness with the beam 1 are conveniently thus accommodated and serve to hold the sleeve 10 in position non-rotatably. The upper end of the sleeve 10 carries a disk 12, which is supported upon the upper side of the beam and standard.

The sleeve 10 and disk 12 are provided with a vertical bore 13, forming a bearing for an approximately vertical shaft 14, upon the upper end of which is mounted a disk 15, having a set-screw 16, whereby said disk is secured upon the shaft 14, thereby preventing the latter from dropping downwardly through the bearing provided for it. A set-collar 17, mounted upon the shaft 14 below the sleeve 10, prevents upward movement of said shaft in its bearings. This shaft is provided at its lower end with a spindle 18, carrying a disk 19 of the ordinary concavo-convex type. Said shaft, moreover, is provided with a clip 20, carrying a scraper 21, which engages the concave side of the disk to prevent dirt from accumulating upon the latter.

22 designates a spacing-bar, which is interposed between the standard-pieces 2 2 and which is retained in position by means of bolts 23, which connect the lower end of the handles 24 with the standard, and also by means of bolts 25, which serve to connect the upper ends of the standard-pieces with braces 26, the opposite ends of which are suitably connected with the handles 24. The latter are spaced by means of a rung 27 of ordinary construction and also by means of a transverse brace-bar 28, the ultimate purpose of which will be presently set forth.

The disk 15 at the upper end of the shaft 14 has an upwardly-extending stem 29, which is pivotally connected with an arm 30, extending laterally from the front end of an operating-bar 31, which latter extends rearwardly and is provided with notches 32 33, adapted to engage the cross-brace 28, connecting the handles.

Pivotally connected with lugs 34, rising from the operating-bar 31, is a lever 35, the rear end of which is forced upwardly by means of a spring 37, which is suitably disposed for the purpose indicated, the rear end of said lever being extended over the handle 36 of the operating-bar 31. The front end of the lever 34 is pivotally connected with a key 38, which extends through an opening 39 in the arm 30 of the operating-bar and which is also adapted to engage one of two suitably-disposed perforations 40 and 41 in the disk 15, which perforations by partially turning the disk may be brought into alinement with corresponding perforations 42 and 43 in the disk 12, underlying the disk 15. It will be seen that by pressing the rear end of the lever downwardly against the tension of the spring 37 until the key or pin 38 is raised out of contact with the perforation 40 or 41 engaged thereby, by next raising the operating-bar until the notch in its under side is out of contact with the brace 38, and by next pulling or pushing the operating-bar, according to the direction in which it is desired to set the plow, the disk 15 and the shaft 14 connected therewith will be partially rotated in the desired direction, and thus shifting the disk 19 from one side of the standard to the other, thus converting the plow from a right-hand to a left-hand plow, or vice versa. By permitting the operating-bar to drop until the lock-notch in its under side engages the cross-bar 28 and by releasing the pressure upon the rear end of the lever 35 the pin or key 38 will be permitted to drop into the perforations of the disks 15 and 12 hitherto unoccupied, thus relocking the parts in their desired relative positions.

The spacing-bar 22, which, as hereinbefore described, is introduced between the members 2 2, constituting the standard, is provided with a forwardly-extending arm 44, having at its front end a bearing 45, which assists in supporting the shaft 14, carrying the disk, thereby enabling the latter to successfully resist any strain to which it is liable to be subjected.

The operation and advantages of this invention will be readily understood from the foregoing description, taken in connection with the drawings hereto annexed. The construction is simple and inexpensive and of such a nature as to enable the plow to be easily and successfully manipulated. For listing purposes a shaft or standard 14ª, carrying a pair of disks 14ᵇ, may be substituted for the standard having the single disk, such shaft being of course mounted with the rotary disks converging forwardly. When this substitution is made, it is obvious that the shaft does not require at any time to be reversed; but the facility wherewith my improved reversible plow lends itself to the substitution for the reversible disk of a listing attachment greatly increases its practical value.

I desire it to be understood that while I have in the foregoing described a simple and preferred form of my invention I do not thereby limit myself to the structural details herein set forth, but reserve the right to any changes and modifications which may be resorted to within the scope of my invention and without departing from the spirit or sacrificing the utility of the same.

Having thus described my invention, I claim—

1. In a plow of the class described, a beam, a standard composed of side pieces spaced by said beam and united by the point, said side pieces being bulged in rear of the beam, a sleeve mounted between the side pieces at the bulged portion thereof, and a disk-carrying shaft revoluble in said sleeve.

2. In a plow of the class described, a beam, a standard composed of side pieces spaced by said beam and having bulged portions in rear of the latter, a sleeve fitted between said bulged portions and having wings spacing the adjacent unbulged portion of the side beams apart, and a disk-carrying shaft mounted revolubly in said sleeve.

3. In a plow of the class described, a beam, a standard composed of side pieces spaced by said beam and having bulged portions in rear thereof, a sleeve supported between the bulged portions of the said side pieces, a disk-carrying shaft mounted revolubly in said sleeve, a horizontally-disposed disk at the upper end of the latter, and a companion disk mounted upon the shaft to retain the latter against downward displacement.

4. In a plow of the class described, a beam, a standard composed of side pieces spaced by said beam and having bulged portions in rear of the latter, a sleeve supported between said bulged portions and having a supporting-disk at its upper end, a disk-carrying shaft mounted revolubly in said sleeve and supporting-disk, a companion disk secured at the upper end of said shaft, and means for retaining the supporting-disk and its companion-disk upon the shaft in adjusted position with relation to each other to thereby retain the disk at the lower end of the shaft in position at either side of the standard.

5. In a plow of the class described, a beam, a standard composed of side pieces spaced by said beam, a sleeve between said side pieces, a disk-carrying shaft journaled in said sleeve, means for partially rotating the shaft in its bearings and for retaining it in adjusted position, a spacing-plate interposed between the side pieces of the standard, and an arm extending forwardly from said spacing-plate and affording an auxiliary bearing for the disk-carrying shaft.

6. In a plow of the class described, a beam, a standard composed of side pieces spaced by the beam, a disk-carrying shaft approximately vertical, supported by the beam, a spacing-plate interposed between the side pieces of the standard, and an arm extending from said spacing-plate and affording an auxiliary bearing for the disk-carrying shaft.

7. In a plow of the class described, an approximately vertically disposed disk-carrying shaft, a sleeve affording a bearing for said shaft, a supporting-disk at the upper end of said sleeve, a companion disk secured to the shaft, an operating-bar having an arm connected pivotally with the said companion disk and provided with a perforation, a lever connected pivotally with the operating-bar and having a pivoted member extending through the perforation of the arm of the operating-bar, and suitably-disposed perforations in the supporting-disk and the companion disk for the reception of said pivoted member.

In testimony that I claim the foregoing as my own I have hereto affixed my signature in the presence of two witnesses.

EDWARD G. HENRY.

Witnesses:
 ED. D. ROBINSON,
 J. M. ECHOLS.